(12) United States Patent
Gnanasambandam et al.

(10) Patent No.: US 8,773,446 B2
(45) Date of Patent: Jul. 8, 2014

(54) SYNCHRONOUS PARALLEL PIXEL PROCESSING FOR SCALABLE COLOR REPRODUCTION SYSTEMS

(75) Inventors: Shanmuga-Nathan Gnanasambandam, Victor, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 719 days.

(21) Appl. No.: 13/023,798

(22) Filed: Feb. 9, 2011

(65) Prior Publication Data

US 2012/0200580 A1     Aug. 9, 2012

(51) Int. Cl.
*G06F 15/80* (2006.01)
(52) U.S. Cl.
USPC ........................................................ 345/505
(58) Field of Classification Search
USPC ........................................................ 345/505
See application file for complete search history.

(56) References Cited

U.S. PATENT DOCUMENTS 5,157,765 A * 10/1992 Birk et al. ..................... 345/506
5,987,226 A * 11/1999 Ishikawa et al. ............. 358/1.13
6,269,376 B1    7/2001 Dhillon et al.

OTHER PUBLICATIONS

David Arthur and Sergei Vassilvitskii. K-Means++: The Advantages of Careful Seeding.

* cited by examiner

*Primary Examiner* — Hau Nguyen
(74) *Attorney, Agent, or Firm* — Philip E. Blair; Fleit Gibbons Gutman Bongini & Bianco P.L.

(57) ABSTRACT

What is disclosed is a novel system and method for parallel processing of intra-image data in a distributed computing environment. A generic architecture and method are presented which collectively facilitate image segmentation and block sorting and merging operations with a certain level of synchronization in a parallel image processing environment which has been traditionally difficult to parallelize. The present system and method enables pixel-level processing at higher speeds thus making it a viable service for a print/copy job document reproduction environment. The teachings hereof have been simulated on a cloud-based computing environment with a demonstrable increase of ≈2× with nominal 8-way parallelism, and an increase of ≈20×-100× on a graphics processor. In addition to production and office scenarios where intra-image processing are likely to be performed, these teachings are applicable to other domains where high-speed video and audio processing are desirable.

16 Claims, 7 Drawing Sheets

SYNCHRONOUS PARALLEL PIXEL PROCESSING FOR SCALABLE COLOR REPRODUCTION SYSTEMS

TECHNICAL FIELD

The present invention is directed to systems and methods which process intra-image pixel-level data on a parallel image processing architecture such as multi-processor, multi-core, or multi-threaded systems.

BACKGROUND

Conventional color controls architectures and algorithms do not offer pixel level processing with the advantages of synchronization amongst workers operating on pieces of an image and automated techniques for scalable parallelization. Image processing, especially color controls, on pixel ensembles of the order of $10^8$-$10^9$ per image are highly data-intensive and computation-intensive requiring scalable parallelization techniques. Some algorithms are not designed to operate in parallel, especially offering advantages like synchronization. The type of parallelization required to address these problems is called connected parallel (involving inter-processor communication) in addition to data parallel stages. Automatically dealing with connected parallel computation is generally hard in parallelization and have to be specifically addressed for the data sizes we consider in color control. Approximation techniques such as interpolation are used in color controls, some of them to deal with the large image sizes. The use of such techniques may result in artifacts and adversely affect in image quality. However, it is desirable to avoid interpolation by processing each pixel individually. Due to large image sizes, failure in a certain stage of processing is not uncommon. A number of such problems at the stage level is because of the asynchronous nature of the processing and could benefit from a small number of retries.

What is needed in this art are increasingly sophisticated systems and methods which facilitates parallel processing of intra-image data in a distributed computing environment.

INCORPORATED REFERENCES

The following U.S. Patents, U.S. Patent Applications, and Publications are incorporated herein in their entirety by reference.

"k-means++: The Advantages of Careful Seeding", David Arthur and Sergei Vassilvitskii, ACM-SIAM Symposium On Discrete Algorithms (SODA), New Orleans, La., (Jan. 7-9, 2007).

BRIEF SUMMARY

What is disclosed is a novel system and method for parallel processing of intra-image data in a distributed computing environment. A generic architecture and method are presented which collectively facilitate image segmentation and block sorting and merging operations in a parallel image processing environment which has been traditionally difficult to parallelize. Broadly defined, the present method involves receiving an image to be processed and segmenting the image into a plurality of image segments. The image segments are then processed in parallel into a plurality of batches of processed pixels. The processed pixels are sorted into sorted batches which, in turn, are merged into a plurality of merged batches. The merged batches are concatenated to produce a processed output image. The present system and method enables pixel-level processing at higher speeds thus making it a viable service for a print/copy job document reproduction environment. The teachings hereof have been simulated on a cloud-based computing environment with a demonstrable increase of ~2× with nominal 8-way parallelism, and an increase of ~20×-100× on a general purpose graphics processing unit (GPU). In addition to production and office scenarios where intra-image processing are likely to be performed, these teachings are applicable to other domains where high-speed video and audio processing are desirable.

In one example embodiment, the present method for parallel processing of intra-image data in a distributed computing environment involves the following. Customer expectation criteria are received. Customer expectation criteria may comprise, for example, a desired or target price for their print/copy job, a desired or target timeframe expectation in which their job is to be processed (i.e., response time), a particular type of processing to be performed on their job, and/or a desired quality of the processed output image. Such a system uses the state of the customer job and the state of the process and/or printing device to create the output. This is called state-based imaging system. A set of resources d in a state-based imaging system having w available resources are determined via an optimization process which meet the customer criteria. The selection of the desired number of available resources may be based upon a prior run history of similar jobs. The state-based imaging system has a plurality of segmentation resources for segmentation processing of an input image, a multiple of k resources available for pixel-level processing an output of each of the segmentation resources, a plurality of sorting resources for sorting an output of each of the pixel-level processors, and a plurality of merging resources capable of hierarchically merging the output of each of the sorting resources to produce a processed image output. A customer billing strategy is implemented based upon the set of resources used to process the customer job $\{R\}$, the number of pixels in the received image P, the total number of pixels processed by each of the pixel-level processing resources $P_i$, where i is the index for the pixel processing resources, the total number of sorted batches produced by the sorting resources $B_s$, the total number of batches merged by the merging resources $B_m$, and/or a size of the processed output image O, i.e., Price=function($\{R\}$, P, $P_i$, $B_s$, $B_m$, O). Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
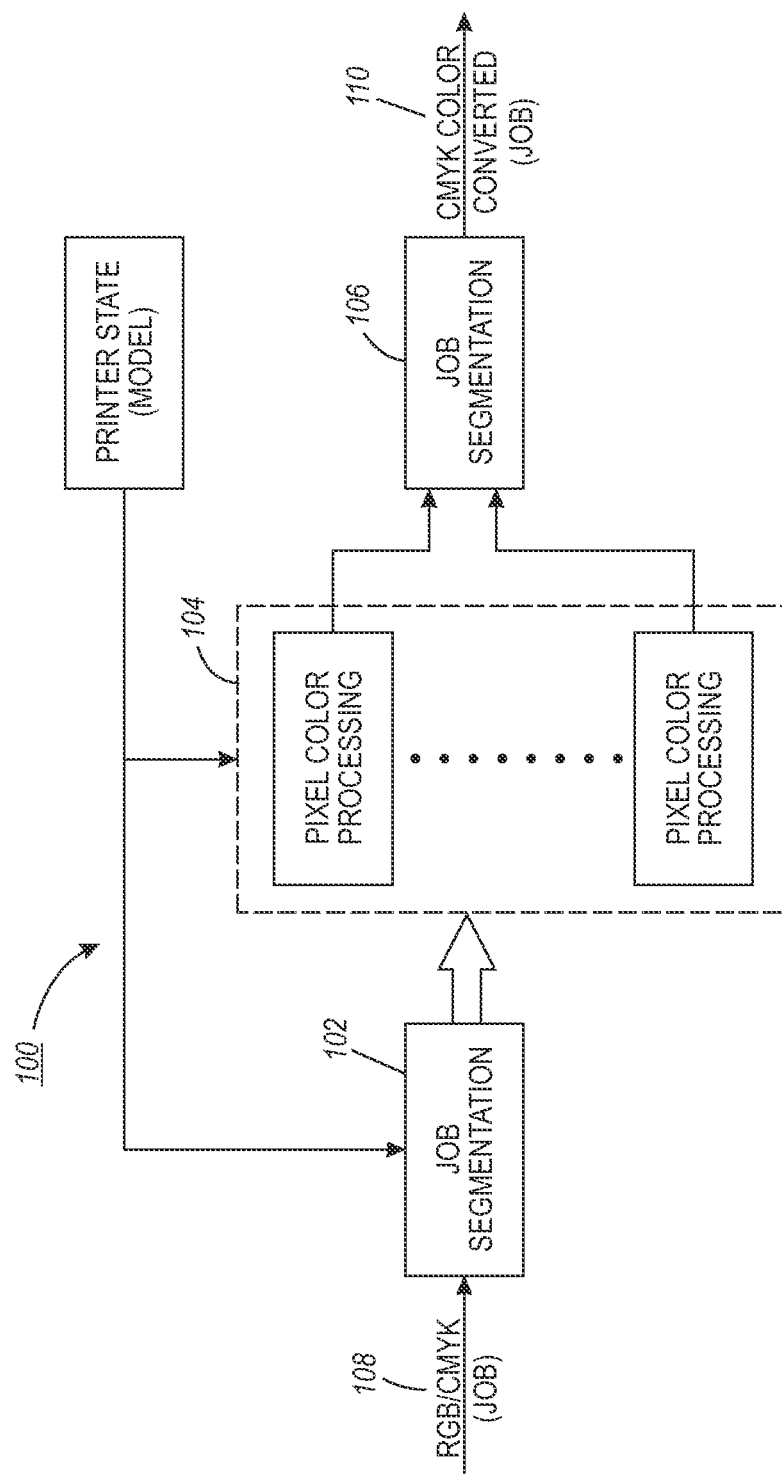
FIG. 1 illustrates a high level block diagram of an example state-based imaging system showing three important parallelized stages; segmentation, pixel processing and merging.

What is disclosed is a novel system and method for parallel processing of intra-image data in a distributed computing environment. A generic architecture and method are presented which collectively facilitate image segmentation and block sorting and merging operations in a parallel image processing environment which has been traditionally difficult to parallelize.

It should be understood that one of ordinary skill in this art would be readily familiar with many facets of color science and image processing and other techniques and algorithms commonly found in the color science and document reproduction arts. Those of ordinary skill would be familiar with the text: *"Digital Color Imaging Handbook"*, 1st Ed., CRC Press (2003), ISBN-13: 97808-4930-9007, and *"Control of Color Imaging Systems: Analysis and Design"*, CRC Press (2009), ISBN-13: 97808-4933-7468, both of which are incorporated herein in their entirety by reference.

Non-Limiting Definitions

A "print/copy job" (or simply "job") as used herein, refers to a logical unit of work that is to be completed for a customer. A job may comprise, for example, an image, a document, a color brochure, photo, film, and the like.

"Segmentation" is the process of partitioning a digital representation of a job into sets of pixels (also referred to as super-pixels) that have a specific group property. The goal of segmentation is to simplify or change the representation of a digitized job into something that is more easily analyzed. The quality of the segmentation depends on the composition of the job being processed. For instance, smoothly shaded surfaces of a digital image comprising clear gray-level steps between different surfaces are more readily segmentable.

"Image segmentation" is a technique which clusters pixels into salient image regions, i.e., regions corresponding to individual surfaces, objects, or natural parts of objects. Image segmentation assigns a label to every pixel in an image such that pixels with the same label share certain visual characteristics. The result of image segmentation is a set of segments that collectively cover the entire image, or a set of contours extracted from the image. Each of the pixels in a region are similar with respect to some characteristic or computed properly, such as color, intensity, texture, and the like. Adjacent regions are significantly different with respect to the same characteristic(s). In semi-automatic segmentation, a user outlines one or more regions of interest within the image and segmentation is applied so that the path that best fits the edge of the image is shown to the user for further selection and/or confirmation.

"Clustering" is a commonly used procedure in data mining algorithms. Practical applications of clustering include unsupervised classification and taxonomy generation, nearest neighbor searching, scientific discovery, vector quantization, text analysis, and navigation.

A "processor core" is a term used herein which is intended to encompass one processing entity of a multi-core, multiprocessor, and/or multi-threaded parallel processing environments.

"Concatenation" refers to any process in which two or more data sets, generated in accordance herewith, are combined, compared, or are otherwise used together in any way.

Brief General Discussion

As discussed in the background section hereof, high quality image rendering systems try to take advantage of regions and groups of pixels in images. Such systems use different techniques for rendering, especially using different profiles for different states or objects as can be defined in the image. Parallelizing at the page level is a first step. Beyond that, parallelizing at the image level introduces issues with respect to communicating image level details to a plurality of parallel processors. Such issues may take the form of non-trivial dependencies, and the like, which are difficult to manage. At the image level, the problem becomes a mixture of connected parallel stages involving inter-processor or inter-core communication & data parallel stages. While parallelization produces benefits, the image processing system needs to be modular as it may be important, at run-time, to be able to add additional processing resource. Moreover, the image processing system needs to have a fair degree of fault tolerance, as resources may be deleted due to natural causes (resource unavailability) or unexpected causes (resource failure). Such capability to add/delete resources for performance reasons without needing to change code is termed scalable and fault-tolerant parallelization. Scalability requires extensive use of multi-core processors, multi-processors and/or general purpose graphics processing units (GPU). This is particularly true for image processing where a given image may consume several gigabytes of memory or storage to manipulate and process, including swap space and meta-data such as profiles, regions in the image, etc. Resorting entirely to a cloud-type computing environment can introduce bandwidth concerns. For a single production quality image-heavy document at 600 dpi, a typical 25 page document may consist of approximately $1.5 \times 10^{10}$ pixels (15 billion) or ~392 GB. Automatic pixel or image level parallelization is also required as each image may take ~40 min to process (e.g. image at 600 dpi).

What is provided herein is a generic multi-stage state-based image processing system which effectuates parallelized image segmentation, pixel-level processing, and sort/merge operations in an image processing environment. In a first stage, a process of image segmentation divided the job (digital image) into segments of substantially similar sizes; each containing meta-data about color clusters of the image. In a second stage, the segments are independently color converted through cluster-specific processing. In a third stage, the clustered segments are sorted and hierarchically merged back into an output image. By making the number of segments in the first or second stages a multiple of the number of available resources (multi-core, multi-processor, and/or multi-threaded resources), and by utilizing a hierarchical merge to reconstruct the image, load balancing and synchronization can be effectively achieved. By automatic selection of the degree of parallelization, synchronization is produced in connected parallel tasks having inter-processor communication across iterations. The present system can be implemented on existing platforms such as MPI (Message Passing Interface).

Note that merely creating equal portions of work does not produce synchronization and may even degrade performance. Synchronization can be interpreted as all of the processors that are working on a stage as completing more or less at the same time. Pixel-level processing is data parallel and can be split into as many pieces as possible subject to processor and bandwidth availability. But synchronization will occur only when the load is suitably allocated.

The outputs of the pixel-level processors are sorted so as to enable efficient merging in linear time. For a large number of sorted lists m to be merged, such time is given as O(p log m) where p is the total number of pixels in a merged batch. Merging can occur hierarchically because of the separation. Portions of the image are streamed batch by batch, i.e., first p pixels are processed then the next p pixels, and so forth, such that the resulting image can be quickly and efficiently reconstructed using, for instance, a process of simple concatenation. The present method allows for logical delineation of segments producing benefits in pixel processing and merging.

Example State-Based Image Processing System

Reference is now being made to FIG. 1 which illustrates a high level block diagram of an example state-based image processing system. The example illustrated state-based system 100 is shown comprising three primary stages, i.e., a segmentation stage 102, a pixel-processing stage 104, and a merging stage 106. Job segmentation module 102 receives an image (job) 108 and performs image segmentation on the received image. Image segments (or clusters) are passed to a plurality of pixel-level processor, collectively at 104, wherein the color pixels are processed in a parallel manner. The results thereof are provided to a job segment merge 106 wherein the processed image segments are merged to produce a color corrected output 110.

Example Distributed Computing Environment

Figure 2:
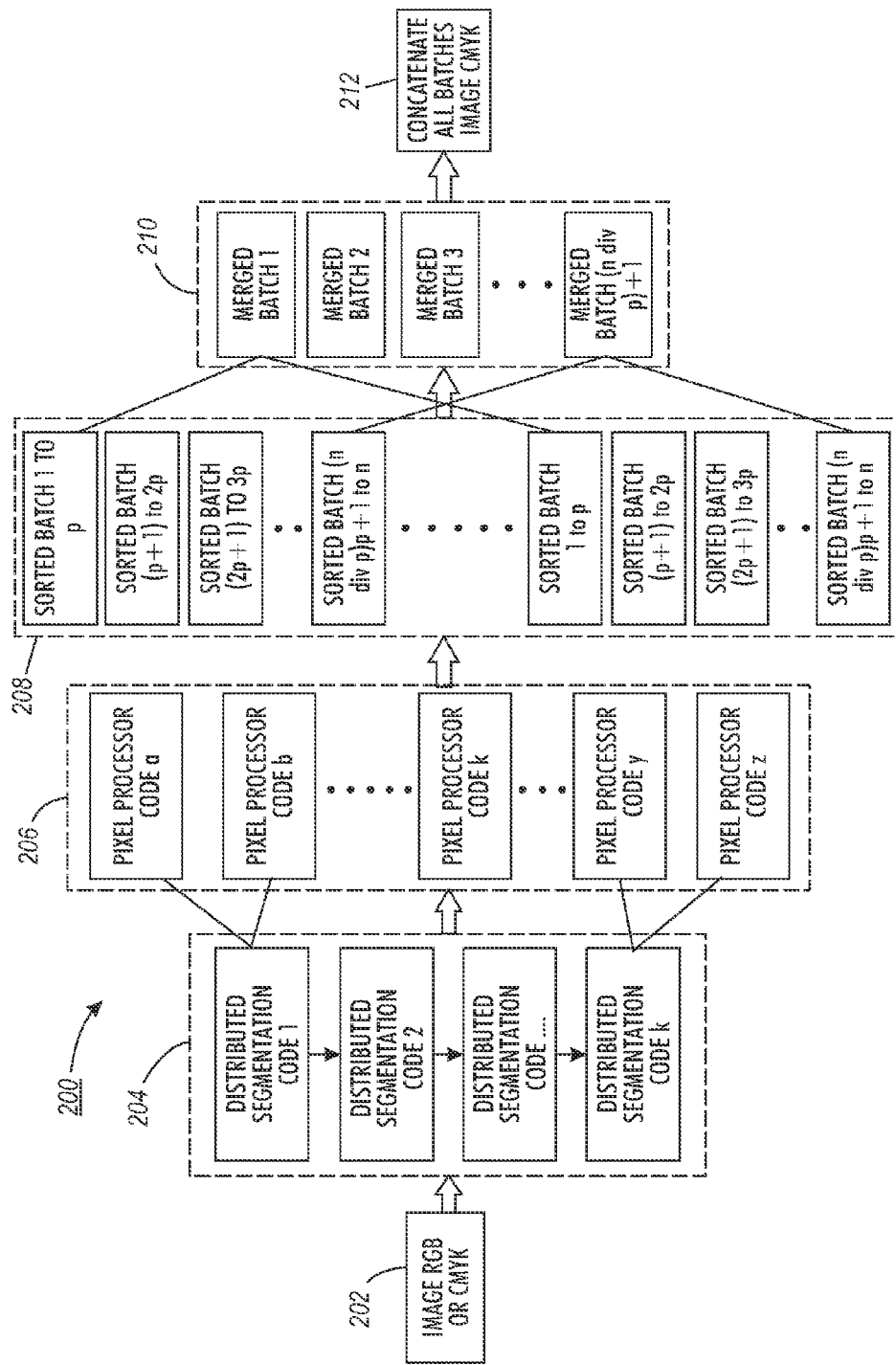
FIG. 2 illustrates an example of scalable distributed state-based imaging system comprising a plurality of parallelized resources comprising processors, threads, modules, and/or code segments.

Reference is now being made to FIG. 2 which illustrates one example scalable distributed state-based imaging system 200 comprising a plurality of parallelized resources (or modules). The state-based imaging system is a distributed computing environment and may be, for example, a plurality of processors, a plurality of multi-core processors, and/or a multi-threaded system. Any of the available resources in the system may comprise one or more distributed code segments.

Received image 202 is provided to a distributed segmentation system 204 which performs image segmentation in a parallel manner. In various embodiments, the number of segments into which the received image is divided is automatically selected as a function of processor availability. At the end of each iteration (of segmentation), information regarding a previous step is shared and updated. Preferably, the information shared comprises meta data which is less bandwidth intensive. The image segments are provided to a plurality of pixel processors 206 wherein processing of the color pixels is performed. Processing of the image segments can be performed with/without further sub-division of the image segments. The results thereof are provided to a plurality of sorted batch code segments 208 which, in a manner more fully described herein, sort the processed pixels into batches of sorted pixels. Such a distributed sorter configuration can sort processed pixels into batches. The sorted processed pixels are provided, in ordered batches, to a distributed, hierarchical merge resource 210 which produces merged batches which are concatenated to produce output image 212. If we let n be the total number of pixels in an image (this is of the order of hundreds of millions) and we let p be the number of pixels desired in a single batch of output, the distributed sorter 208 can sort the image into several batches such that output of the segment processed by each pixel processor 206 is in ordered batches comprising approximately (n div p)+1 batches, with each batch having at most p pixels.

Figure 7:
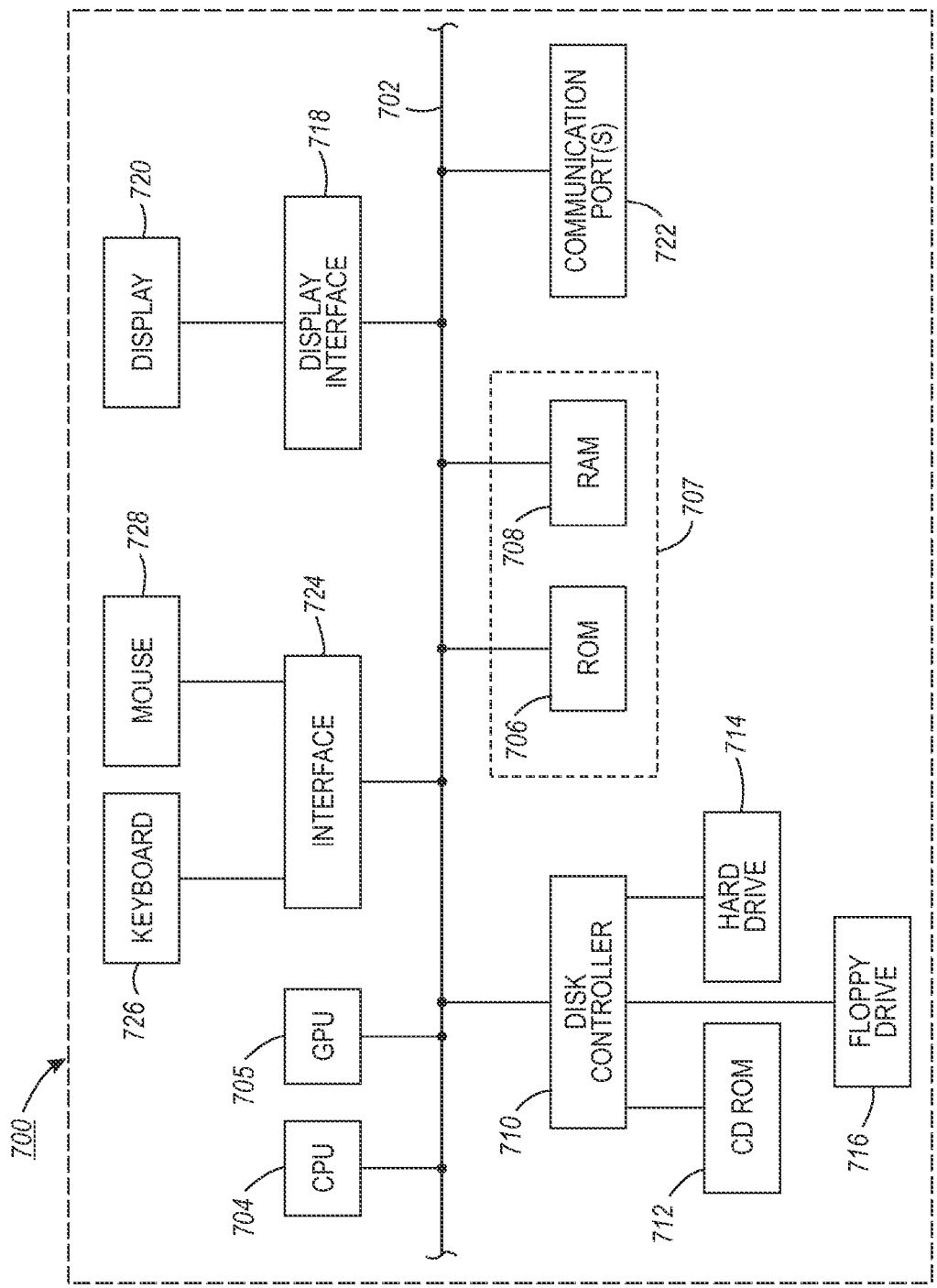
FIG. 7 illustrates a block diagram of one example embodiment of a special purpose computer system useful for implementing one or more aspects of the resources of FIGS. 1 and 2 as further described with respect to the various flow diagrams of FIGS. 4 and 5.

It should be appreciated that any of the components (or 'modules') of any of the embodiments of FIGS. 1 and 2 may designate a resource comprised of software or hardware, or a combination of both. A module may be implemented using a single software program comprising, at least in part, machine readable program instruction, or a single piece of hardware such as an ASIC, GPU, FPGA, electronic circuit, or special purpose processing system as shown in FIG. 7. A plurality of modules may collectively perform a given function. A plurality of modules may be executed by either a single computer system or a plurality of computer systems operating in parallel. Connections between modules include both physical and logical connections.

Flow Diagram of First Embodiment

Figure 3:
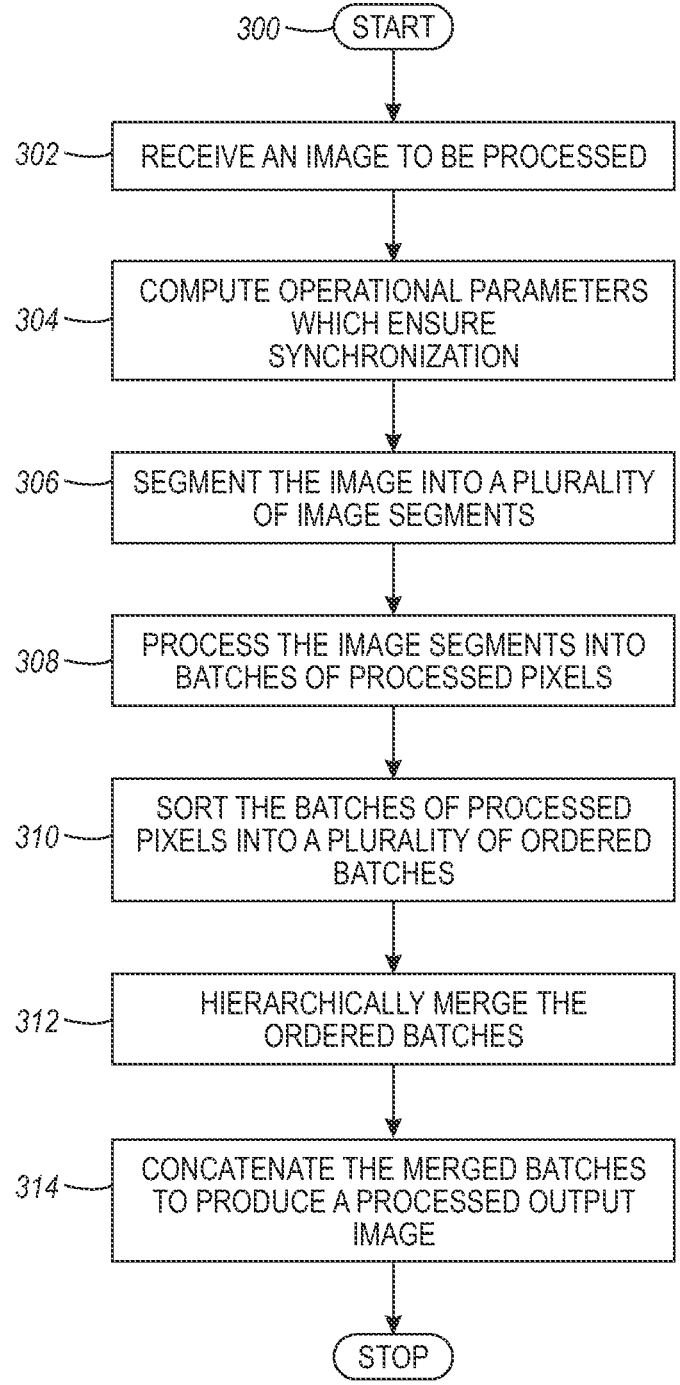
FIG. 3 is a flow diagram of one example embodiment of the present method for parallel processing of intra-image data in a distributed computing environment.

Reference is now being made to the flow diagram of FIG. 3 which illustrates one example embodiment of the present method for parallel processing of intra-image data in a distributed (preferably self-optimized and autonomic) computing environment. Flow processing starts at 300 and immediately proceeds to step 302.

At step 302, an image to be processed is received in a state-based imaging system having a set of w available resources. One example system is shown and discussed with respect to FIG. 2. The image can be received from a remote device over a network such as a WIFI, LAN, or Internet. The image may alternatively be retrieved from memory or storage.

At step 304, operational parameters are computed which ensure synchronization of the segmentation, pixel processing, and merging operations. Operational parameters are based on the parallel processing environment wherein the methods hereof find their intended uses. One skilled in this art would appreciate that operation parameters generated for a parallel processing environment can, at least in part, be based on a wide variety of factors such as, for example, image characteristics, resource availability, and quality of service required.

At step 306, the image is segmented into a plurality of image segments using, for example, the distributed segmentation system 204 wherein image segmentation is performed in a parallelizable manner.

At step 308, the image segments are processed into a plurality of batches of processed pixels using, for example, the plurality of pixel processors 206 wherein processing of the color pixels is performed in a parallelizable manner. Processing of the image segments can be performed with/without further sub-division of the image segments. Pixel-level processing is data parallel and can be split into as many pieces as possible for processing subject to processor and bandwidth constraints. The processed pixels are provided as an output in the form of batches of pixels. It should be understood that the term "processing" refers to any transformation, whether mathematical or logical, and also is intended to encompass GPU operations including associated transfers.

At step 310, the batches of processed pixels are sorted into a plurality of ordered batches using, for example, the plurality of sorted batch code segments 208 which sort the processed pixels into batches of sorted pixels. Such a distributed sorter configuration can sort processed pixels into ordered batches.

At step 312, the ordered batches are hierarchically merged into a plurality of merged batches using, for example, the distributed, hierarchical merge resource 210 which produces merged batches.

At step 314, the merged batches are concatenated to produce a processed output image. Thereafter, in this embodiment, further processing stops.

Flow Diagram of Second Embodiment

Figure 4:
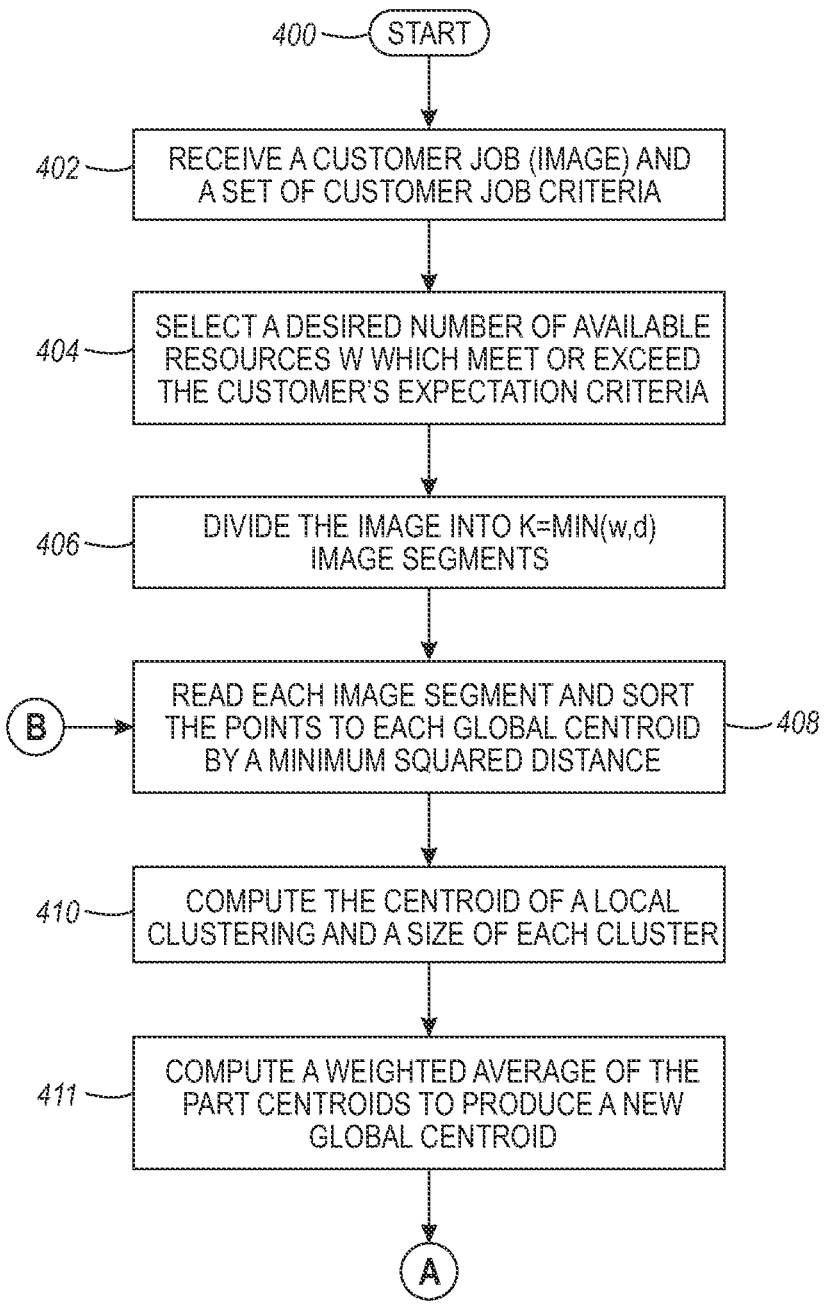
FIG. 4 is a flow diagram of one example embodiment of a resource availability-aware distributed k-means segmentation for connected parallel computation in the state-based imaging system.

Reference is next being made to the flow diagram of FIG. 4 which illustrates one example embodiment of a resource availability-aware distributed k-means segmentation for connected parallel computation in the state-based imaging system having w available resources. Each of the available resources can process a code segment in parallel with the others. Processing begins at step 400 and immediately proceeds to step 402.

At step 402, receive a customer job and at least one customer expectation criteria. The job comprises at least one image to be processed in a state-based imaging system having a set of w available resources. One example system is shown and discussed with respect to FIG. 2. The image can be received from a remote device over a network such as a WIFI, LAN, or Internet. The image may alternatively be retrieved from memory or storage. The customer criteria may take the form of, for example, a desired or target price point for the customer job, a desired or target timeframe in which the customer job is to be processed, a type of processing desired to be performed on the customer job, and/or a desired quality of the processed output image.

At step 404, a desired number of resources d are selected from a set of available resources w in a state-based image processing system which meet or exceed the customer's expectation criteria. A speed requirement s may also be estimated for this job. Resource selection may be determined from run histories of similar jobs. The resources are preferably selected via a dynamic optimization strategy. The state-based imaging system has a plurality of image segmentation resources, a multiple of k resources available for pixel-level processing, a plurality of sorting resources, and a plurality of merging resources.

At step 406, the image is divided into k=min(w,d) image segments. If each image segment is available as more subdivided files, then there will still be an integral multiple of k files to process. A k-means image segmentation is pre-employed such that k is selected in a manner which apportions work for distributed segmentation 204 of FIG. 2 to keep the parallel segmentation process in synchronization in a system comprising an integral multiple of k segments and k pixel-level processors. The image can be stored as k parts in a distributed file system. Segments are preferably stored as separate files but this may not be desirable in all cases. As a bandwidth optimization, segments may be logically delineated (storing meta-data concerning segment for each pixel) as opposed to being physically separated. As an example, segment information may be stored along with each core of the GPU system as associated metadata. This avoids transportation of files or segments for subsequent stages. This optimization produces efficiencies in subsequent pixel-level processing, sorting, and merge stages. Preserving the original order comes with a penalty i.e., the need to store another file of the order of 2*n where n is of the order of $10^9$, decisions such as this have to be weighed carefully.

At step 408, read each image segment and sort the points to each global centroid by a minimum squared distance. Each resource operates on each part of the image in parallel and goes through each pixel and associates the pixel to one of k known global centroids according to a nearest mean squared distance. The k-means algorithm is utilized because this algorithm tries to minimize the average squared distance between points in the same cluster. The k-means algorithm is a procedure for clustering data sets which assumes that the data objects to be clustered are available as points (or vectors) in a d-dimensional Euclidean space. The k-means algorithm seeks a minimum variance grouping of data that minimizes the sum of squared Euclidean distances from certain cluster centroids. The K-means algorithm is an iterative technique that is used to partition an image into K clusters. In one embodiment, the basic algorithm is as follows:

1) Pick K cluster centers (either randomly or based on some heuristic).
2) Assign each pixel in the image to the cluster that minimizes the variance between the pixel and the cluster center.
3) Re-compute the cluster centers by averaging all of the pixels in the cluster.
4) Repeat steps 2 and 3 until convergence is attained (e.g. no pixels change clusters).

In this case, variance is the squared or absolute difference between a pixel and a cluster center. The difference is typically based on pixel color, intensity, texture, and location, or a weighted combination of these factors. K can be selected manually, randomly, or by a heuristic. This algorithm is guaranteed to converge, but it may not return the optimal solution. The quality of the solution depends on the initial set of clusters and the value of K. While the k-means algorithm is effective, it is no panacea for large databases like those of text documents and customer market data, which often include millions of data points. Applying the k-means algorithm in such cases can result in unacceptably long processing times and may exhaust the memory capacity of the processor implementing the algorithm. Moreover, although the k-means algorithm is guaranteed to find local optima, it is unlikely to find global optima. Computational complexity is often described in terms of the number of floating point operations (flops) such as additions, multiplications, or comparisons required to perform the computation.

The global centroids can be arbitrary or set using k-means++ algorithm, or using other known algorithms. These can also be chosen as a function of image attributes providing however that something is known about the color space of the input image. K-means++ is a probabilistic means of initialization for k-means clustering created by Arthur and Vassilvitskii that has theoretical guarantees on expected outcome quality. Briefly, the k-means++ algorithm generates initial centers for k-means clustering. A first center $c_1$ is sampled from a uniform distribution over a set of points X. Then, for k=2 to K: the $k^{th}$ center $c_k$ is sampled from a multinomial over X where point x has probability $\theta_x$ as defined by:

$$\theta_x = \frac{D(x)^2}{\sum_{x' \in X} D(x')^2} \propto D(x)^2 \quad (1)$$

where D(x) is the distance d to the closest center $c_{k'}$, as given by $$D(x) = \min_{k' < k} d(x, c_{k'}) \quad (2)$$

In the present system, the work of computing the distance to the globally known cluster centroids is allocated to a plurality of distributed code segments 1 through k. These code segments also compute the local cluster centroids—the centroids of the subset of points allocated to each distributed code segment. These two pieces of work are carried out every iteration until convergence. The cluster centroids are calculated and updated as the weighted centroids of the local centroids (i.e. for each segment), at the end of each iteration. Near synchronous completion of work that is assigned to the distributed code segments in every iteration is essential; the lack of such synchronization may result in wasted time in this connected parallel computation. The present method accounts for such synchronization by allocation of an equal quantum of work for each of the distributed code segments. Because of the connected parallel nature, each distributed code segment is required to complete the work assigned in about the same time as the others for a given iteration. For this reason, the number of segments is selected as a function of the total number of resources available. After resource availability has been determined for a given job, the number of segments further depends on the speed requirements and the size of the input files.

At step 410, upon completion of all the pixels, each resource computes the centroid of its local clustering and the size of each cluster. The part centroids and cluster sizes are communicated for processing at approximately the same time because of the nearly equal work that is apportioned to each resource.

At step 411, compute a weighted average of the part centroids to produce at a new global centroid. Here, the global centroid computation uses the part sizes as weights.

Figure 5:
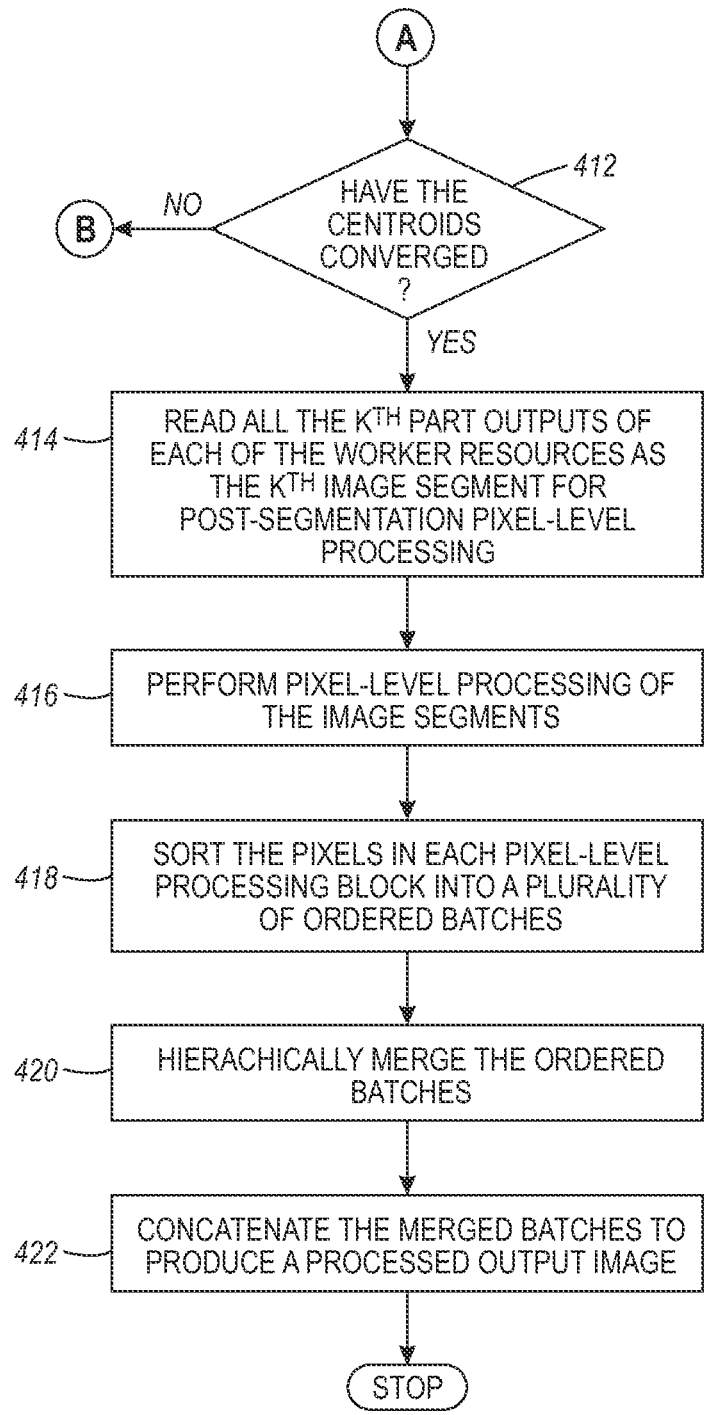
FIG. 5 is a continuation of the flow diagram of FIG. 4 with processing continuing with respect to node A.

Reference is now being made to FIG. 5 which is a continuation of the flow diagram of FIG. 4 with processing continuing with respect to node A.

At step 412, the centroids are checked for convergence. If not then processing repeats, for a next iteration, with respect to node B wherein, at step 412, the points to each global centroid are sorted by a minimum squared distance. The next iteration starts subsequently unless the centroids have converged. If, at step 420, convergence has been achieved then image segmentation is complete. Upon computation of these segments, they are written to memory or storage. While writing these to storage, the segments can be broken down into more than the number of pixel processors. All become available simultaneously for the next stage of intra-image processing.

At step 414, read all the $k^{th}$ part outputs of each of the segmentation resources as the $k^{th}$ image segment for post-segmentation pixel-level processing. Each of the pixel processors is preferably operating completely in parallel. As soon as a certain pixel processor completes, the pixel processors are assigned a new task. There is benefit to the number of pixel processors being an integral multiple of k. With the choice of k made previously, we ensure that all image segments can be processed by the pixel processors in parallel. By the same token, if we want to perform the pixel processing in multiple stages, the image segments can be divided into an integral multiple of k so that at every sub-stage of pixel processing achieves a maximum parallelization. Because the pixel processors can apply different processing techniques, semantics may be assigned to segment based upon segment type in a pre-processing step. The segment type could denote either (a) a color-related type, or (b) an object-related type. Pre-processing of a segment prior to pixel processing helps to reveal the type of transformation that needs to be applied to that segment. For example, skin tones, facial features, trees, landscape, scenery etc, may be processed differently. Any type of pixel processing can be introduced in this stage.

At step 416, perform pixel-level processing of the image segments.

At step 418, the pixels in each pixel-level processing block are sorted into ordered batches. For increased bandwidth and image streaming, decide the number of pixels desired in each of the output batches, p. Parts of the image can be made available earlier or in a slightly delayed fashion. This will produce (n div p)+1 total sorted batches of pixels-per-pixel processor. Each of the batches may not comprise exactly p pixels, but they are guaranteed to be sorted. The sorted batches help with the efficiency of merging. The fact that, in the pixel processing stage, the pixels are in order and can also be taken advantage of, although they may not have pixels for each of the batches.

At step 420, the ordered batches are hierarchically merged. This is another stage that is difficult to parallelize in image processing. However, owing to the sorted lists created, merging can occur in linear time. If we do this in parallel we achieve the merge in O(p log m) time where p is the number of pixels per merged batch and m is the number of sorted lists that have to be merged (using known results in merging sorted lists). Normally, m is small and p can be chosen such that:

$$(n \text{ div } p)+1 \leq \min(w,d) \quad (3)$$

This will allow for fast merges by ensuring there are k resources available for the merge operation. Also, all the merges (except perhaps the last one) may complete at nearly the same time achieving synchronization. So we not only achieve higher speeds due to parallelization, but achieve synchronization as well. While the present algorithms have been designed to achieve synchronization, failures do occur due to input and output latencies between the stages or other concurrent uses of the cluster. So, in order to better manage merging, so long as we know we have at least 2 sorted lists that need to be present in a particular merged batch, the merge process can be started immediately. As soon as the other lists arrive, they are merged with the results of the previous merge. For example, if there are 5 sorted batches to be merged to batch 1, there could be a merge sequence as follows:

$$\text{merge}(1,5) \rightarrow \text{merge}(\{1,5\},2), \text{merge}(3,4) \rightarrow \text{merge}(\{1,2,5\},\{3,4\}) \quad (4)$$

At step 422, the merged batches are concatenated to produce a processed output image. Thereafter, further intra-image processing stops.

Figure 6:
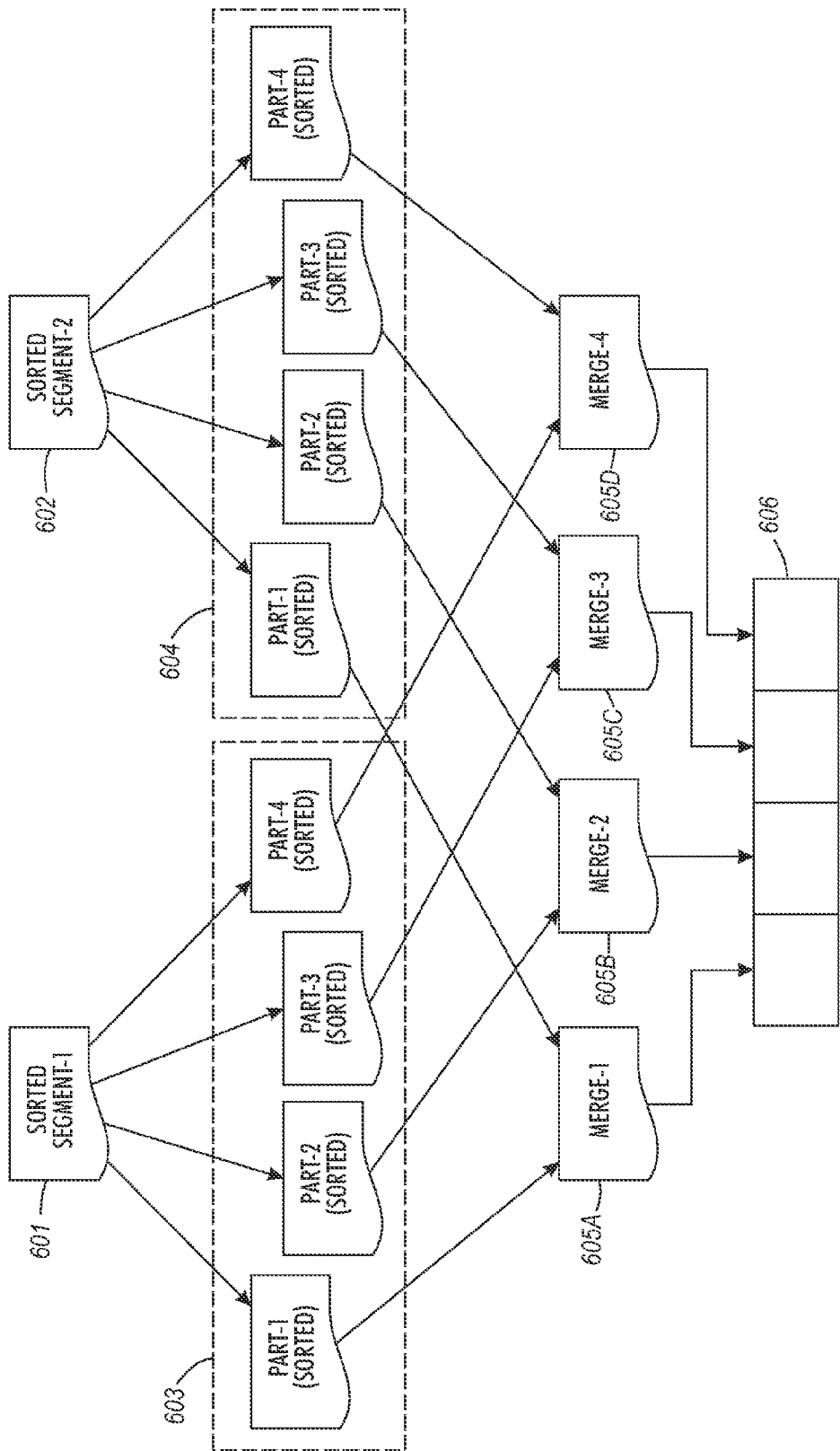
FIG. 6 depicts one example embodiment of a distributed (hierarchical) merge operation in accordance with the method described with respect to FIG. 5.

Reference is now briefly being made to FIG. 6 which depicts one example embodiment of a distributed (hierarchical) merge operation of n-sorted segments where n=2. Sorted segments 601 and 602 each comprise a plurality of ordered portions 603 and 604, respectively. These are merged into a plurality of merge batches, shown as 605A-D. The merged batches are concatenated to produce processed output image 606.

Average Time Complexity for a Uni-Processor System

For a uni-processor system, the average-case time complexity is given by the following. Let n be the number of pixels, k the number of clusters, d the number of dimension and T the number of iterations. For k-means, the time complexity is: $O(n*k*d*T)$. Pixel processing is linear in the number of pixels, $O(n)$ and merging being n log n assuming merge sort.

Average Time Complexity for a Parallel System

Assuming there are going to k workers set according to availability and other considerations as above, clustering will take $O(ndT)$ with synchronization benefits. Profiling and grouping will take $O(n/k)$ with synchronization benefits. Merging will take $O(n/k \log k)$ again with synchronization benefits. In total, theoretical estimates are of the order of 1/k times the uni-processor version with synchronization benefits (owing to intertwining the choice of k with processor availability w and desired number of processors d). In reality, there will be I/O overheads as are dealing with large files resulting in less than k times speedup but with synchronization benefits.

In-Situ Pixel Processing in GPU

The algorithm hereof could be implemented on a GPU. The groups, parts, segments, etc., can be maintained as metadata associated with each pixel. Metadata can be stored for a group of pixels of a given section or sub-section of the image in memory associated with the GPU along with that of the $(i,j)^{th}$ pixel. Pixel or group dependent processing may be stored in memory associated with that pixel. Optimizations include the following considerations. 1) One can reduce the number of processing cores required based on pixel redundancy and GPU capacity in terms of the number of processing cores. 2) Several iterations of transfer back and forth to the GPU main memory may be required. The number of trips/iterations can be pre-determined based on the number of CPU-based calculations that need to be performed. 3) Segment by segment differentiated processing can be performed in multiple iterations. In this instance, each iteration can be given a certain pixel processing algorithm to perform, as discussed above with respect to step 414.

Image Path Equivalences

In this section, we claim image path equivalence using the workflow on the internal cloud. Methodology for quality improvements are not claimed herein. We conducted experiments using a high-resolution image tabloid car image and the ADSB boundless image (1 thread: 9.43 minutes, 4 threads: 7.8 minutes, 8 threads: 4.75 minutes).

This feasibility, in one embodiment, was performed on an iGen4 print engine with a FFPS DFE (Free Flow Print Server Digital Front End) and an internal cloud. A 350 dpi image was used for the printing demonstration. The test image is in RGB color space and was processed using SBI (state-based imaging) image path on cloud processors. We carried out following steps for the demonstration. (A) Process the RGB image with a custom global ICC profile. Create a CMYK color separated image by applying the custom global ICC profile. All of this image processing is done on the FFPS DFE and printed on iGen4. This is a normal print path on iGen4 being used for printing any RGB images. We used a perceptual LUT from the destination profile to create the image. (B) Process the RGB image (tiff version) through the "state-based image path" on the cloud. We had created two segments. Both segments were processed using the perceptual LUT from the global destination profile. After merging two segments using the approach described in FIG. 2, the state-based image path resulted in the creation of a CMYK image in tiff format. We printed this unified image through the native CMYK path on iGen4. This process completely removed the image processing in the FFPS DFE that occurred in step A. (C) Process the RGB image (tiff version) through the "state-based image path" on the cloud computer. We had created two segments same as in step B. This time, we processed the segments as follows. Segment one with global destination profile and segment two with optimized destination profile for segment two. The segment two destination profile was optimized to remove the artifacts present in the image for the purpose of this demonstration. Both segments were then merged to obtain a CMYK image. We printed this image CMYK image through the native CMYK path on iGen4. This process again completely removed the image processing in the FFPS DFE that occurred in step A. As expected, image quality artifacts present in the image were completely removed from the reproduced image.

In another embodiment, the pixel processing could be used for handling/correcting blurry images, red-eye correction, and the like, in various photo processing applications Results demonstrated that printed images from steps A and B appeared visually similar. These steps visually demonstrated the image path equivalence (parallel processing being equivalent to uni-processor versions with increase in speed). Step C demonstrated the improvement to image quality due to the use of optimized profile LUT local to the color segment. Thus the above architecture has been demonstrated to the extent that we can indeed optimize the image for image quality local to the segment/object based on the state of the image and the state of the printer—on one printer for one critical image with two segments.

Example Special Purpose Computer System

Reference is now being made to FIG. 7 which illustrates a block diagram of one example embodiment of a special purpose computer system useful for implementing one or more aspects of the resources of FIGS. 1 and 2 as further described with respect to the various flow diagrams of FIGS. 4 and 5.

In FIG. 7, communications bus 702 serves as an information highway interconnecting the other illustrated components of special purpose computer system 700. The special purpose computer incorporates a central processing unit (CPU) 704 capable of executing machine readable program instructions for performing any of the calculations, comparisons, logical operations, object identifications and extractions, user marking identifications and extractions, and other program instructions for performing the methods described above with respect to the flow diagrams and illustrated embodiments hereof. The CPU is in communication with Read Only Memory (ROM) 706 and Random Access Memory (RAM) 708 which, collectively, constitute main memory 707. Such memory may be used to store machine readable program instructions and other program data and results to sufficient to carry out any of the functionality described herein.

Graphics Processing Unit (GPU) 705 performs pixel-level processing of image data and utilizes main memory 707 to store processed pixels in the form of batches of pixels.

Disk controller 710 interfaces with one or more storage devices 714. These storage devices may comprise external memory, zip drives, flash memory, USB drives, memory sticks, or other storage devices with removable media such as CD-ROM drive 712 and floppy drive 716. Machine executable program instructions for executing the methods hereof or for performing any of the functionality shown with respect to the embodiments of FIGS. 1 and 2, for example. Any of the document images and bitmaps may also be stored on any of these storage devices. Example computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein. Display interface 718 effectuates the display of information on display device 720 in various formats such as, for instance, audio, graphic, text, and the like. Interface 724 effectuates a communication via keyboard 726 and mouse 728. Communication with external devices may occur using example communication port(s) 722. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 722 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

Various Embodiments

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for parallel processing of intra-image data in a state-based imaging system, the method comprising:

receiving at least one customer expectation criteria with respect to a customer job intended to be processed by a state-based imaging system comprising w available resources, said customer criteria comprising at least a type of processing desired to be performed on said customer's job;

selecting a desired number d of said available resources in said state-based imaging system which at least meet said customer's expectation criteria;

using at least one segmentation resource to segment said image into $k=\min(w,d)$ image segments;

using k pixel-level processors to process said k image segments into batches of processed pixels, each pixel-level processor operating on a respective $k^{th}$ segment in parallel;

using at least one sorting resource to sort said batches of processed pixels into a plurality of ordered batches;

using at least one merging resource to hierarchically merge said ordered batches into a plurality of merged batches of processed pixels; and concatenating said merged batches of processed pixels to obtain a processed image.

2. The method of claim 1, wherein said state-based imaging system comprises any of: a plurality of processors, a plurality of multi-core processors, and a multi-threaded system.

3. The method of claim 1, wherein any of said w available resources comprises a distributed code segment.

4. The method of claim 1, wherein segmenting of said image is performed using a distributed segmentation algorithm that selects said k number of image segments.

5. The method of claim 1, wherein said selection of said desired number of available resources is based upon any of: a prior run history of similar jobs, and a dynamic optimization strategy.

6. The method of claim 1, wherein said customer expectation criteria comprises any of:

a desired price point for said customer job;

a desired timeframe in which said customer job is to be processed; and a desired quality of said processed output image.

7. The method of claim 1, further comprising billing said customer for said job according to a billing criteria comprising any of:

said desired number of resources d used to process said customer job;

said number of pixels in said received image;

said total number of pixels processed by each of said pixel-level processing resources;

said total number of sorted batches produced by said sorting resources;

said total number of batches merge by said merging resources; and a size of said processed output image.

8. The method of claim 1, wherein said selection of said desired number of available resources is based upon a prior run history of similar jobs.

9. A state-based imaging system for parallel processing of intra-image data, said state-based imaging system comprising:

at least one segmentation resource for segmenting an input image into $k=\min(w,d)$ image segments, where w is a number of available resources in said stage-based imaging system and d is a number of said available resources selected to at least meet a customer's expectation criteria comprising at least a type of processing desired to be performed on said customer's job;

a plurality of pixel-level processors for processing said k image segments into batches of processed pixels, each processor operating on a respective $k^{th}$ segment in parallel;

at least one sorting resource for sorting said batches of processed pixels into ordered batches of processed pixels;

at least one merging resource for hierarchically merging said ordered batches to produce a plurality of merged batches of processed pixels; and a processor executing machine readable instructions for concatenating said plurality of merged batches of processed pixels to obtain a processed image.

10. The system of claim 9, wherein said state-based imaging system comprises any of: a plurality of processors, a plurality of multi-core processors, and a multi-threaded system.

11. The system of claim 9, wherein any of said w available resources comprises a distributed code segment.

12. The system of claim 9, wherein segmenting of said image is performed using a distributed segmentation algorithm that selects said k number of image segments.

13. The system of claim 9, wherein said selection of said desired number of available resources is based upon any of: a prior run history of similar jobs, and a dynamic optimization strategy.

14. The system of claim 9, wherein said customer expectation criteria comprises any of:

a desired price point for said customer job;

a desired timeframe in which said customer job is to be processed; and a desired quality of said processed output image.

15. The system of claim 9, further comprising billing said customer for said job according to a billing criteria comprising any of:

said desired number of resources d used to process said customer job;

said number of pixels in said received image;

said total number of pixels processed by each of said pixel-level processing resources;

said total number of sorted batches produced by said sorting resources;

said total number of batches merge by said merging resources; and a size of said processed output image.

16. The system of claim 9, wherein said selection of said desired number of available resources is based upon a prior run history of similar jobs.

* * * * *